United States Patent [19]
Hirashima

[11] Patent Number: 5,936,678
[45] Date of Patent: Aug. 10, 1999

[54] VIDEO SIGNAL PROCESSING DEVICE, INFORMATION PROCESSING SYSTEM, AND VIDEO SIGNAL PROCESSING METHOD

[75] Inventor: Satoshi Hirashima, Suwa, Japan

[73] Assignee: Seiko Epson Corporation, Tokyo, Japan

[21] Appl. No.: 08/661,856

[22] Filed: Jun. 11, 1996

[30] Foreign Application Priority Data

Jun. 16, 1995 [JP] Japan ................................ 7-174201

[51] Int. Cl.⁶ ................ H04N 5/04; H03L 7/00
[52] U.S. Cl. ............. 348/537; 348/572; 327/263
[58] Field of Search .................... 348/537, 536, 348/510, 512, 513, 501, 572, 573, 542, 554, 552, 551; 327/231, 263, 3; 375/373, 376; H04N 5/04

[56] References Cited

U.S. PATENT DOCUMENTS

| | | | |
|---|---|---|---|
| 4,774,577 | 9/1988 | Takimoto | 348/537 |
| 4,791,488 | 12/1988 | Fukazawa et al. | 348/537 |

FOREIGN PATENT DOCUMENTS

| | | |
|---|---|---|
| 0 202 015 | 11/1986 | European Pat. Off. . |
| 0 498 064 | 8/1992 | European Pat. Off. . |
| 62-140558 | 6/1987 | Japan . |
| 62-258570 | 11/1987 | Japan . |
| 3-295367 | 12/1991 | Japan . |
| 4-96093 | 3/1992 | Japan . |
| 4-276791 | 10/1992 | Japan . |
| 4-291390 | 10/1992 | Japan . |
| 5-66752 | 3/1993 | Japan . |
| 5-199481 | 8/1993 | Japan . |
| 5-204329 | 8/1993 | Japan . |
| 6-282349 | 10/1994 | Japan . |
| 7-56553 | 3/1995 | Japan . |

*Primary Examiner*—Michael H. Lee
*Attorney, Agent, or Firm*—Eric B. Janofsky

[57] ABSTRACT

An A/D converter samples an analog video signal, having a frequency corresponding to various types of image supply apparatus, and converts the signal into a digital signal. A sampling clock signal supply circuit supplies a sampling clock signal to the A/D converter, and comprises an edge detection circuit for adjusting the phase of the sampling clock signal. The edge detection circuit subjects the video signal and a delayed video signal to subtraction processing to generate edge pulses. A processor selects a sampling clock signal of a desired phase based on edge information determined by these edge pulses. The present device can also adjust a threshold voltage that is input to the comparator, and the phase of the sampling clock signal based on a digital signal, and supply a dedicated video signal for phase adjustment from a personal computer.

20 Claims, 15 Drawing Sheets

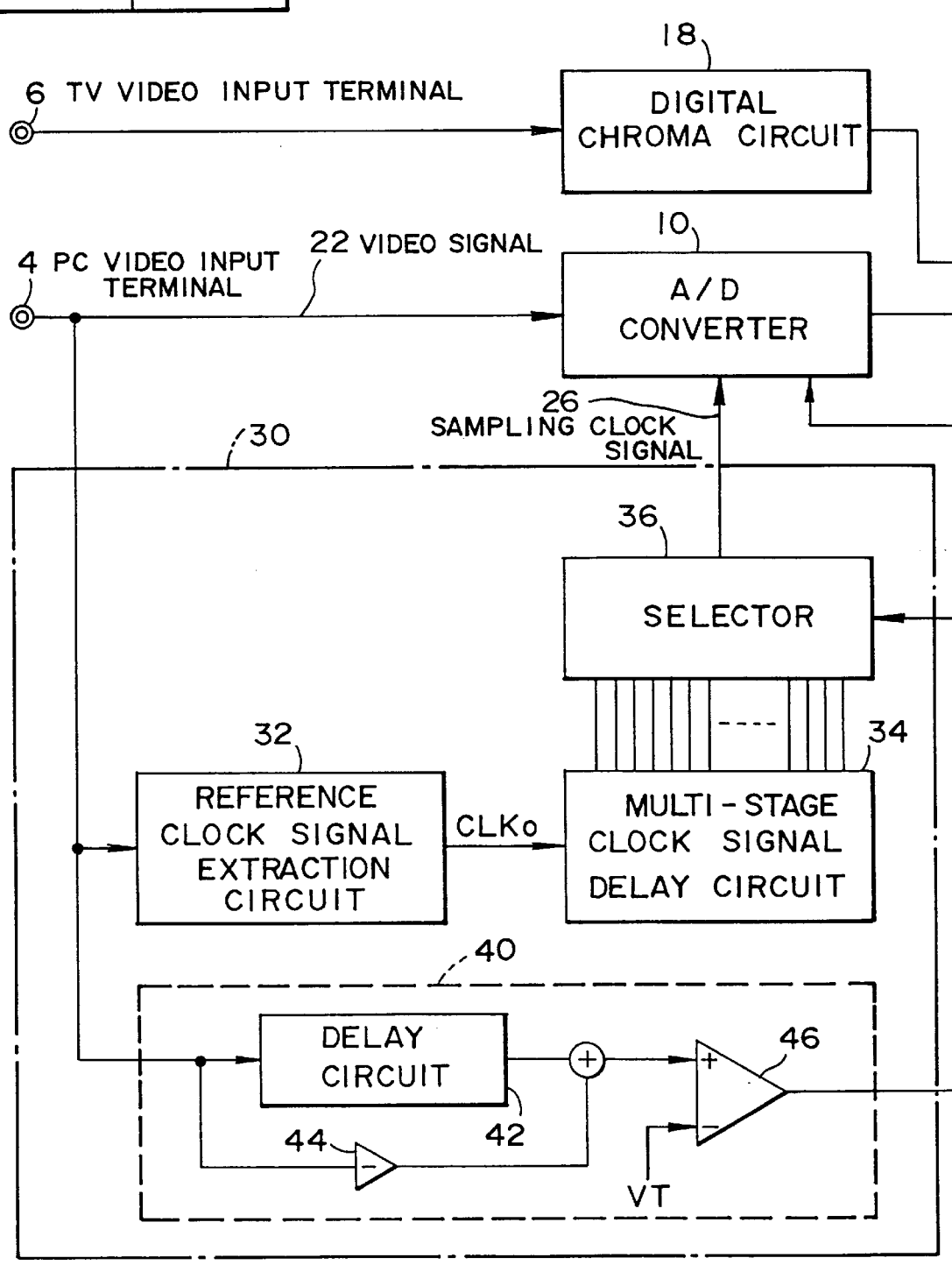

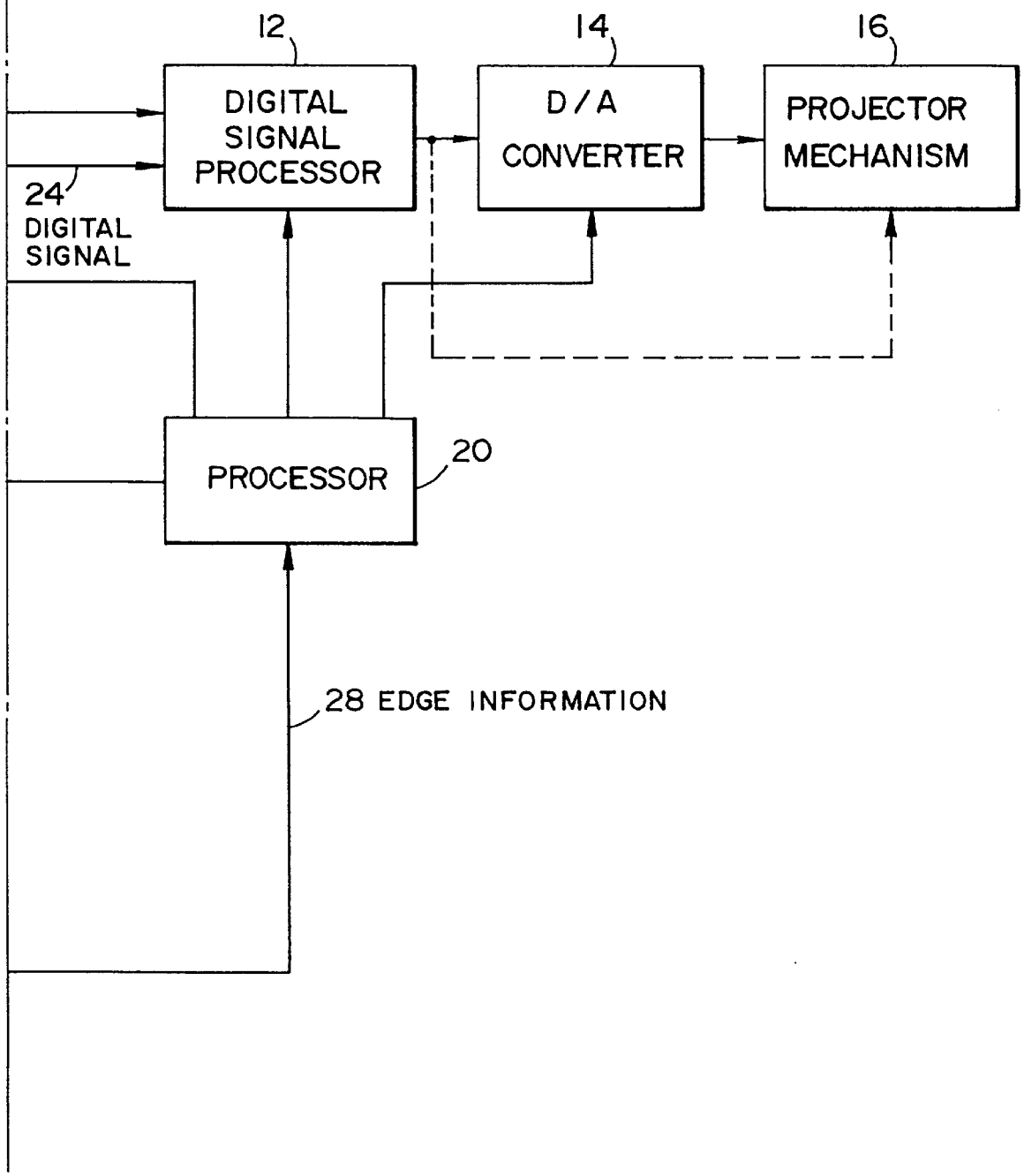

FIG._5

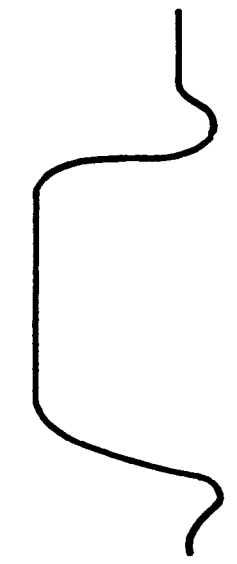
FIG.11A  FIG.11B  FIG.11C —— 0.3 VDC
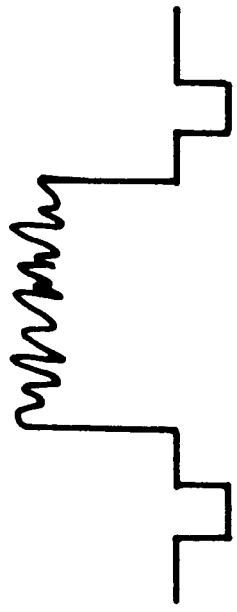
FIG.11D  FIG.11E  FIG.11F —— 0.1 VDC

VIDEO SIGNAL PROCESSING DEVICE, INFORMATION PROCESSING SYSTEM, AND VIDEO SIGNAL PROCESSING METHOD

BACKGROUND OF THE INVENTION

1. Field of the Invention

The present invention relates to a video signal processing device, an information processing system comprising this video signal processing device, and a method of processing a video signal.

2. Description of the Related Art

A conventional information processing system uses an image supply apparatus such as a personal computer, multimedia terminal, and game machine to supply a video signal and output the signal to a display device such as a monitor or a liquid crystal panel. In such a system, the configuration is such that the image supply apparatus and the display device are linked together by an analog interface, and an analog video signal from the image supply apparatus is supplied to the display device. Therefore, if it is desired to subject the supplied video signal to digital signal processing, the video signal should first be converted by an A/D converter into a digital signal. Then, the converted signal be output to the display device through a D/A converter after the signal has been subjected to the digital signal processing.

Currently, the development and implementation of a projection type of display system is in progress as one type of multimedia presentation system. To ensure that an information processing system such as this projection type of display system can be used in as many situations as possible, it is preferable to develop a system which can be connected to and compatible with all types of personal computer. However, it is unfortunately true that the clock frequencies of video signals differ between different personal computers. Thus, it is difficult to adjust the phase of a sampling clock signal used by the A/D converter, if the clock frequencies of different types of personal computer are greatly different. If it is not possible to adjust the phase of the sampling clock signal as appropriate, problems such as a dramatic deterioration in the display characteristics will occur.

One method that has been considered for implementing such a phase adjustment is to have the user manually operate a control called SYNC adjustment. Nevertheless, this operation places a large burden on the user in that it is complicated and difficult to understand. That is why it is desired to provide a system that enables simple and automatic adjustment of the phase of the sampling clock signal.

SUMMARY OF THE INVENTION

The present invention has been devised in order to solve the above concern with the prior art. Its objective is to provide a video signal processing device, an information processing system, and a method of processing a video signal that enables simple adjustment of the phase of a sampling clock signal.

In order to solve the above described problem, a first aspect of the present invention provides a video signal processing device, comprising: an A/D converter which samples an analog video signal having a frequency corresponding to various types of image supply apparatus by a given sampling clock signal, and converts the sampled signal into a digital signal; and a sampling clock signal supply circuit for supplying the sampling clock signal to the A/D converter; and wherein the sampling clock signal supply circuit comprises an edge detection circuit for obtaining edge information to adjust the phase of the sampling clock signal; and the edge detection circuit comprises a circuit for generating an edge pulse by subtraction processing based on the video signal and a delayed video signal.

This aspect of the invention generates edge pulses by subjecting a video signal and a delayed video signal to subtraction processing, and the edge pulses or information obtained from the edge pulses is used as edge information in the adjustment of the phase of the sampling clock signal. The width of the edge pulses is obtained from the video signal and the delayed video signal, and can be determined by the delayed time of the delayed video signal. Thus the width of the edge pulses can be kept constant, regardless of the state of the video signal, making it possible to guarantee stable operation of the circuitry to which these edge pulses are input. This aspect of the invention makes it possible to obtain appropriate edge information, even when ringing occurs or the video signal is noisy, so that a suitable sampling clock signal can be obtained and thus a high-quality display image can be obtained.

A second aspect of the present invention provides a video signal processing device, comprising: an A/D converter which samples an analog video signal having a frequency corresponding to various types of image supply apparatus by a given sampling clock signal, and converts the sampled signal into a digital signal; and a sampling clock signal supply circuit for supplying the sampling clock signal to the A/D converter; and wherein the sampling clock signal supply circuit comprises an edge detection circuit for obtaining edge information to adjust the phase of the sampling clock signal; and the edge detection circuit comprises a circuit for generating an edge pulse based on the video signal, a circuit for comparing the amplitude voltage of the edge pulse with a given threshold voltage, and an adjustment circuit for adjusting the value of the threshold voltage.

This aspect of the invention makes it possible for an adjustment circuit to adjust the value of a threshold voltage that is compared by a comparison circuit with the amplitude voltage of the edge pulse. Thus, the threshold voltage can be increased if the amplitude voltage of the edge pulse is large, or decreased if the amplitude voltage is small. This makes it possible to prevent problems such as misoperation of the comparison circuit due to noise.

In this case, the adjustment circuit preferably adjusts the threshold voltage in accordance with the magnitude of the amplitude voltage of the video signal. This is because the amplitude voltage of edges pulses is often large when the amplitude voltage of the video signal is large.

A third aspect of the present invention provides a video signal processing device, comprising: an A/D converter which samples an analog video signal having a frequency corresponding to various types of image supply apparatus by a given sampling clock signal, and converts the sampled signal into a digital signal; a sampling clock signal supply circuit for supplying the sampling clock signal to the A/D converter; and a phase adjustment means for adjusting the phase of the sampling clock signal based on a digital signal that is output from the A/D converter.

This aspect of the invention makes it possible for the phase adjustment means to check the digital signal that is obtained by the A/D converter by using the given sampling clock signal, and adjust the phase of the sampling clock signal on the basis of the result of this check. The digital signal obtained by the sampling clock signal that has been subjected to this phase adjustment can be checked again and the phase of the sampling clock signal can be adjusted on the basis of the result of this check, so that a sampling clock signal of an appropriate phase can be obtained by repeating this process. This aspect of the invention makes it possible to implement complicated and highly accurate phase adjustment, using any processor that operates with any given software.

With this aspect of the invention, the phase adjustment means may perform the phase adjustment by comparing a digital signal that is output from the A/D converter when the sampling clock signal has a first phase and a digital signal that is output from the A/D converter when the sampling clock signal has a second phase. Adjusting the phase by comparing the results with first and second phases in this manner enables a simple method of determining the maximum and minimum values of a characteristic of the video signal, such as its brightness.

With this aspect of the invention, the video signal processing device may further comprise a circuit for extracting a reference clock signal from the video signal; a circuit for generating clock signals with different phases, based on the extracted reference clock signal; a selector for selecting one of the clock signals and supplying the selected clock signal as the sampling clock signal to the A/D converter; and means for indicating to the selector which of the clock signals is to be selected. This makes it possible to implement adjustment of the phase of the sampling clock signal by simply selecting one of a plurality of clock signals, which simplifies the circuit configuration and speeds up the processing.

A fourth aspect of the present invention relates to an information processing system that comprises an image supply apparatus for supplying a video signal and the above described video signal processing device, wherein the video signal processing device comprises means for subjecting a digital signal that is output from the A/D converter to given digital signal processing.

This aspect of the invention enables the implementation of various types of digital signal processing, such as on-screen display and digital y correction, on a digital signal obtained by subjecting a video signal to sampling and A/D conversion by an appropriate sampling clock signal.

A fifth aspect of the present invention relates to an information processing system comprises an image supply apparatus for supplying a video signal and the above described video signal processing device, wherein the video signal processing device comprises means for converting a given television video signal into a digital signal and means for selecting one of the digital signal and a digital signal that is output from the A/D converter as an image signal.

This aspect of the invention makes it possible to subject both a digital signal obtained by converting a television picture and a digital signal obtained by conversion by the A/D converter to the same processing by the same hardware after the conversion, enabling a decrease in size of the hardware.

A sixth aspect of the present invention relates to an information processing system comprising an image supply apparatus for supplying a video signal and a video signal processing device for performing a given type of signal processing on the video signal, wherein the image supply apparatus comprises: means for generating a phase-adjustment video signal; and the video signal processing device comprises: an A/D converter which samples an analog video signal supplied from the image supply apparatus by a given sampling clock signal, and converts the sampled signal into a digital signal; and a sampling clock signal supply circuit for supplying the A/D converter with a sampling clock signal whose phase is adjusted based on the phase-adjustment video signal.

With this aspect of the invention, a video signal for phase adjustment is supplied from the image supply apparatus, so that a sampling clock signal of an appropriate phase can be obtained on the basis of this phase-adjustment video signal. In other words, since the phase of the sampling clock signal can be adjusted by using a special video signal, a reliable and highly accurate sampling clock signal can be obtained, regardless of the state of the display image. The phase-adjustment signal in this case is preferably one formed from a repeating pattern that alternates between maximum and minimum values of brightness for each dot.

With this aspect of the invention, the video signal processing device may comprise means for indicating to the image supply apparatus to supply the phase-adjustment video signal. This makes it possible to provide phase adjustment of the sampling clock signal during a period such as when the video signal processing device is on standby after it has been turned on.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 1, 1A and 1B show an example of the configuration in accordance with a first embodiment of the present invention;

FIGS. 11A to 11F show examples of the waveforms formed within an adjustment circuit;

Figure 2A:
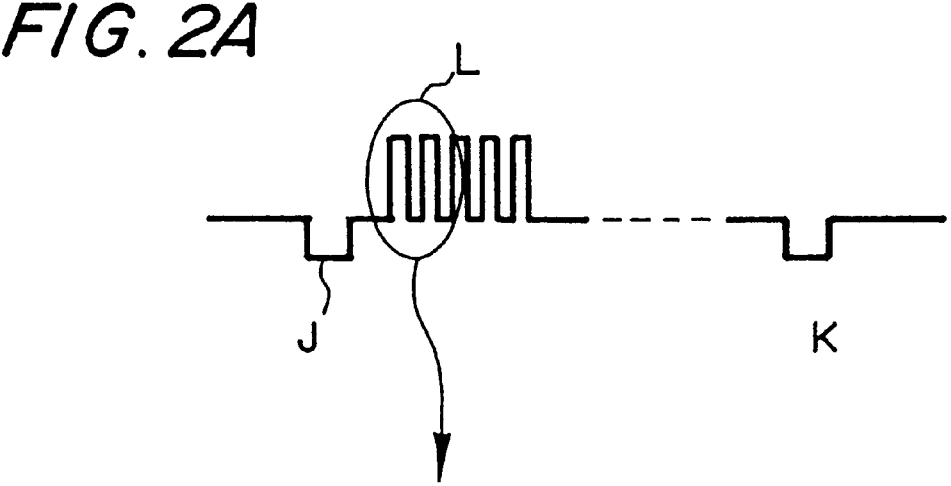
FIGS. 2A to 2C show examples of the video signal waveform.

DESCRIPTION OF THE PREFERRED
EMBODIMENTS

First Embodiment

A first embodiment of the present invention is shown in FIGS. 1, 1A and 1B. This embodiment generates an edge pulse by performing a subtraction based on a video signal and a signal that is delayed by the video signal, then adjusts the phase of a sampling clock signal of an A/D converter on the basis of the edge pulse. Note that the description of the following embodiments mainly deals with examples in which the present invention is applied to a projection type of display system, though the present invention is not necessarily limited thereto.

An analog image signal (video signal) 22 is input to an A/D converter 10 from an image supply apparatus such as a personal computer, via a PC video input terminal 4. The A/D converter 10 converts the video signal 22 into a digital signal 24, and outputs the thus obtained digital signal 24 to a digital signal processor 12. The digital signal processor 12 subjects the digital signal 24 to various types of digital signal processing for on-screen display (the display of additional material such as writing on the screen) and digital y correction. A signal that has been subjected to the digital signal processing is converted into an analog signal by a D/A converter 14, and is output to a projector mechanism (display device) 16. The projector mechanism 16 projects a picture from the personal computer onto a screen, and comprises a signal driver, a scan driver, a liquid crystal panel, and an optical system.

In this embodiment, A/D conversion is necessary to enable the analog video signal 22 that is input from the personal computer to be subjected to various types of digital signal processing. However, it should be noted that this A/D conversion would still be necessary, even if the signal is not subjected to processing to enable on-screen display. In other words, it is preferable that the recently developed projection type of display system is capable of displaying TV images, making it necessary to provide a digital chroma circuit 18 for converting a TV video signal into an RBG signal. This TV video signal may be of any of various formats, such as NTSC and PAL/SECAM, and is received via a TV video input terminal 6. The output of the digital chroma circuit 18 is usually a digital signal. Therefore, to make it possible for a projection type of display system to display both images from a personal computer and a TV set, it is necessary to convert the TV image into a digital signal in the same manner as the video signal 22 from the personal computer. That is why the A/D conversion performed by the A/D converter 10 is necessary, even if no digital signal processing is required for purposes such as on-screen display.

Note that the signal after D/A conversion is input to the projector mechanism 16 in FIG. 1, but the output of the digital signal processor 12 may be input directly to the projector mechanism 16 if the projector mechanism 16 has a digital interface. The digital signal processor 12 selects either the output of the A/D converter 10 or the output of the digital chroma circuit 18.

A sampling clock signal supply circuit 30 supplies a sampling clock signal 26 to the A/D converter 10, when it is necessary to sample the video signal 22. The sampling clock signal supply circuit 30 comprises a reference clock signal extraction circuit 32, a multi-stage clock signal delay circuit 34, a selector 36, and an edge detection circuit 40. A processor 20 provides control over the entire apparatus, and comprises components such as a CPU and memory. The processor 20 also indicates to the sampling clock signal supply circuit 30 (the selector 36 therein) that the phase of the sampling clock signal is to be adjusted, on the basis of edge information 28 that is input thereto from the edge detection circuit 40.

Figure 2B:
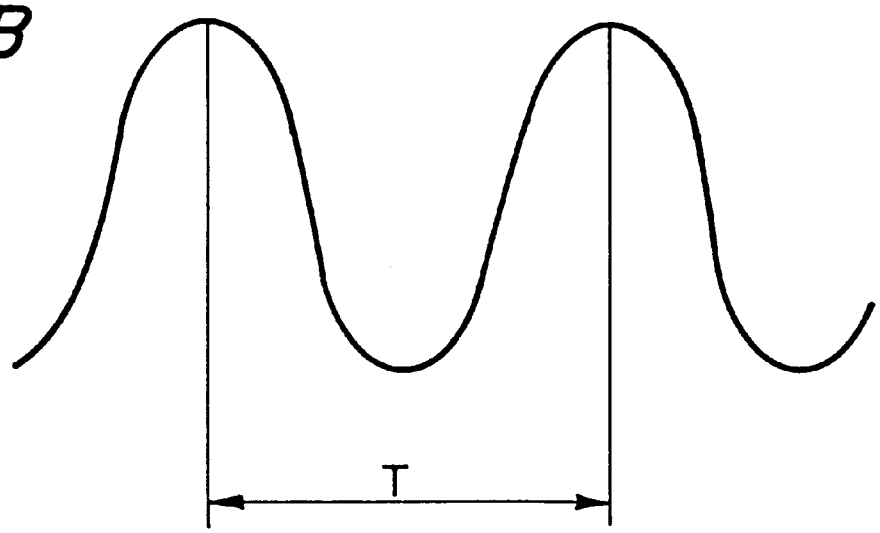
Figure 2C:
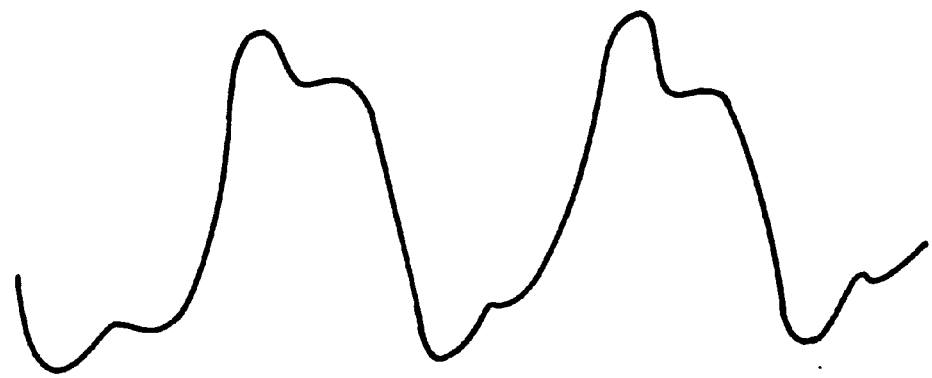

The configuration and operation of the present embodiment will now be described in detail. An example of the video signal 22 that is input from a personal computer is shown in FIG. 2A. The pulses shown at J and K in this figure are used for enabling horizontal synchronization and are equivalent to a horizontal synchronization signal. A part L of the waveform in FIG. 2A is shown enlarged in FIG. 2B. If the period of the video signal is assumed to be T, a frequency F=1/T will differ according to the type of personal computer that is supplying the video signal. This frequency is approximately 25 MHz in a personal computer manufactured by IBM Corporation, for example, but it is 21 MHz in a personal computer manufactured by NEC Corporation. There are also subtle differences in frequency between different models produced by IBM Corporation, as well as differences in the quality of the video signal, i.e., differ frequency characteristic. This has various effects on the video signal. For instance, the waveform of the video signal should ideally be as shown in FIG. 2B. Nevertheless, in practice it depends on the capabilities of the video board and other components used by the personal computer and often ringing noise is superimposed on the signal, as shown in FIG. 2C.

The above described A/D converter 10 is able to input various types of video signals, with different characteristics such as frequency that depend on the type of personal computer. However, to make the system more universal, it is preferable that the A/D converter 10 is compatible with all types of personal computer. Thus, it is necessary to design the A/D converter 10 for the conversion of all types of video signal as appropriate.

Figure 3:
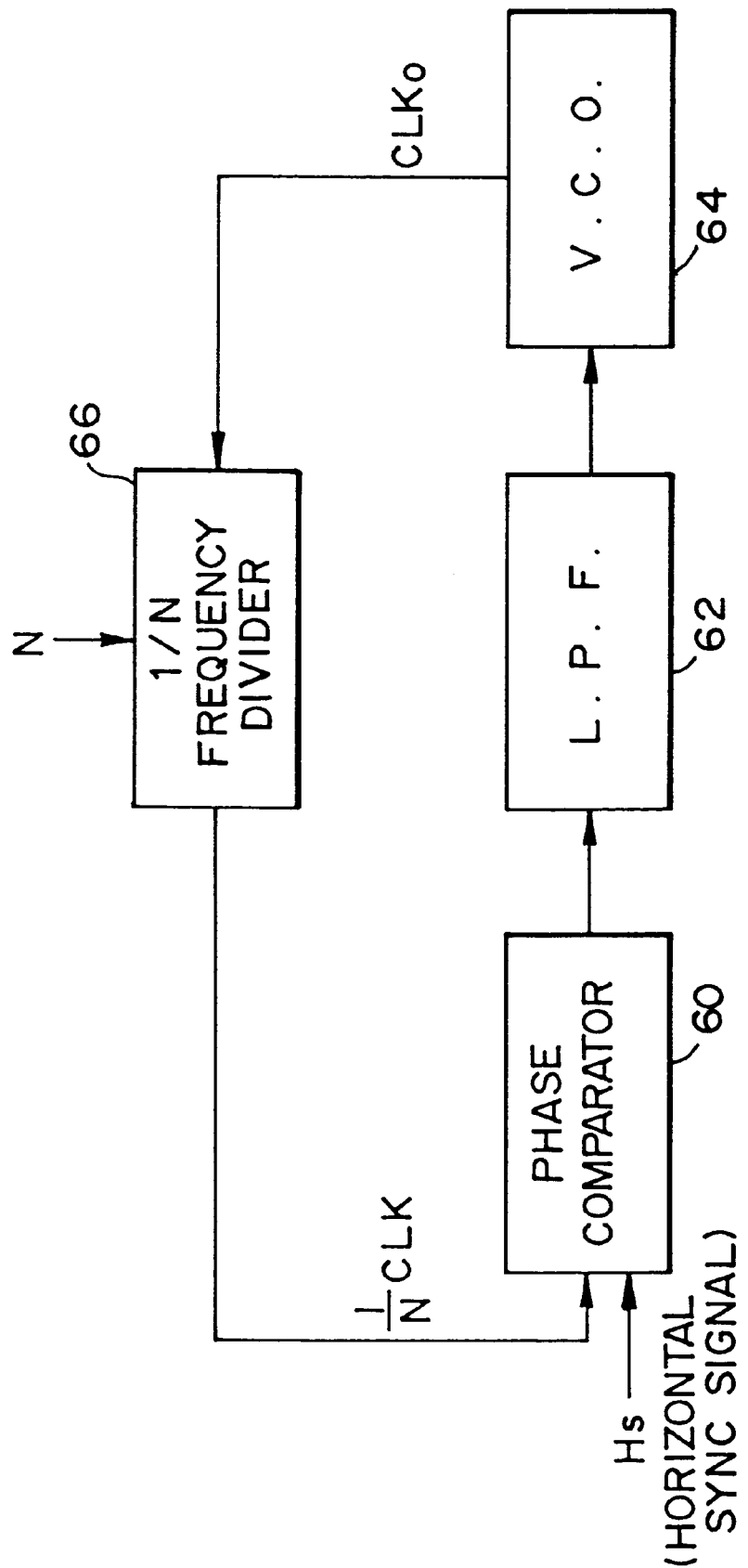
FIG. 3 shows an example of the configuration of a reference clock signal extraction circuit.

An example of the configuration of the reference clock signal extraction circuit 32 is shown in FIG. 3. The reference clock signal extraction circuit 32 extracts a clock signal to act as a reference from the video signal. A typical configuration of this circuit may comprise a phase comparator 60, a low-pass filter (LPF) 62, a voltage-controlled oscillator (VCO) 64, and a 1/N frequency divider 66. Inputs to the phase comparator 60 are an horizontal synchronization signal Hs that is equivalent to pulses J and K in FIG. 2A and a signal that is an output CLK0 from the VCO 64, divided by N by the 1/N frequency divider 66. With the VGA standard, there are 640 dots across the screen in the scan direction, which means that the value of N set in the 1/N frequency divider 66 would be approximately 800. Thus, if the frequency of the horizontal synchronization signal Hs is assumed to be Fs, a reference clock signal CLK0 having a frequency of 800×Fs is output from the VCO 64. This reference clock signal CLK0 also acts as a dot clock signal for display devices such as liquid crystal displays.

Figure 4:
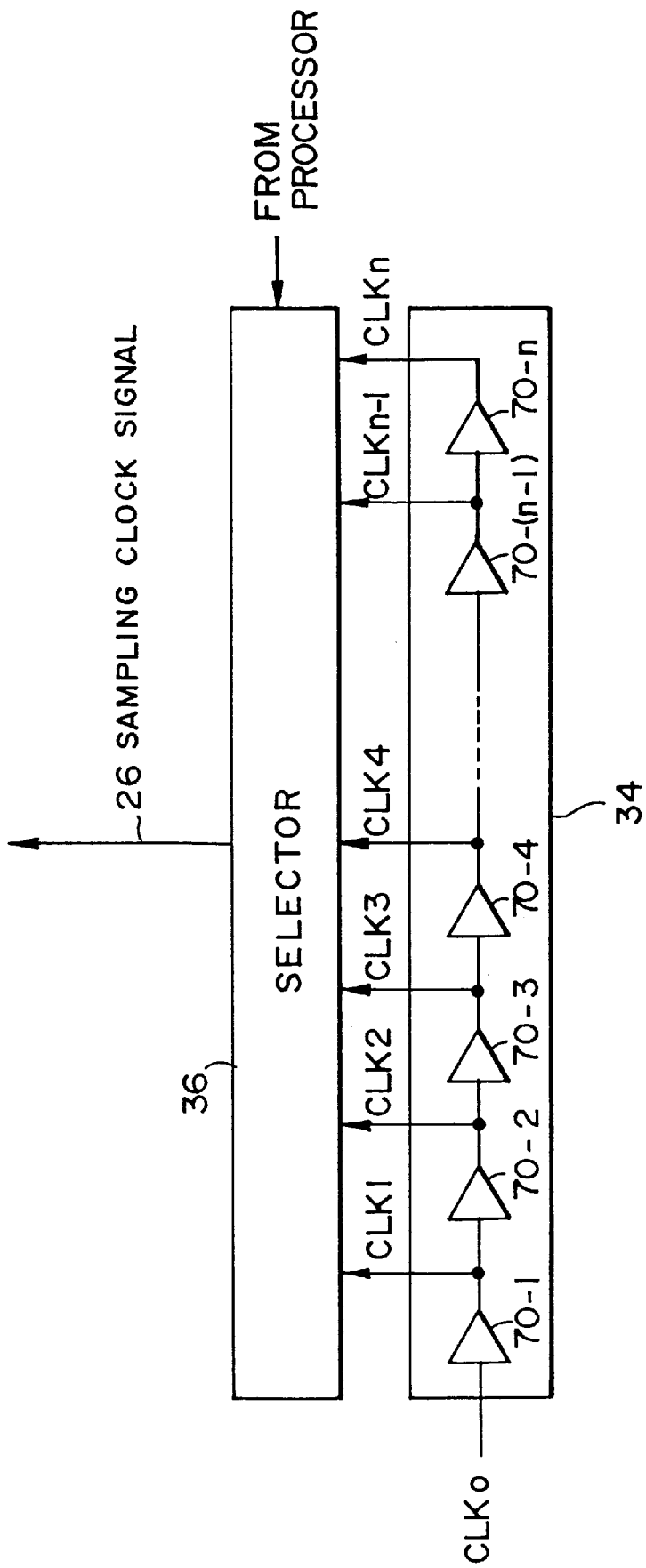
FIG. 4 shows an example of the configuration of a multi-stage clock signal delay circuit.

An example of the configuration of the multi-stage clock signal delay circuit 34 is shown in FIG. 4. This multi-stage clock signal delay circuit 34 comprises serially connected buffers 70-1 to 70-n. The reference clock signal CLK0 extracted by the reference clock signal extraction circuit 32 is input to the first buffer 70-1, and outputs CLK1 to CLKn from these buffers are input to the selector 36.

Figure 5:
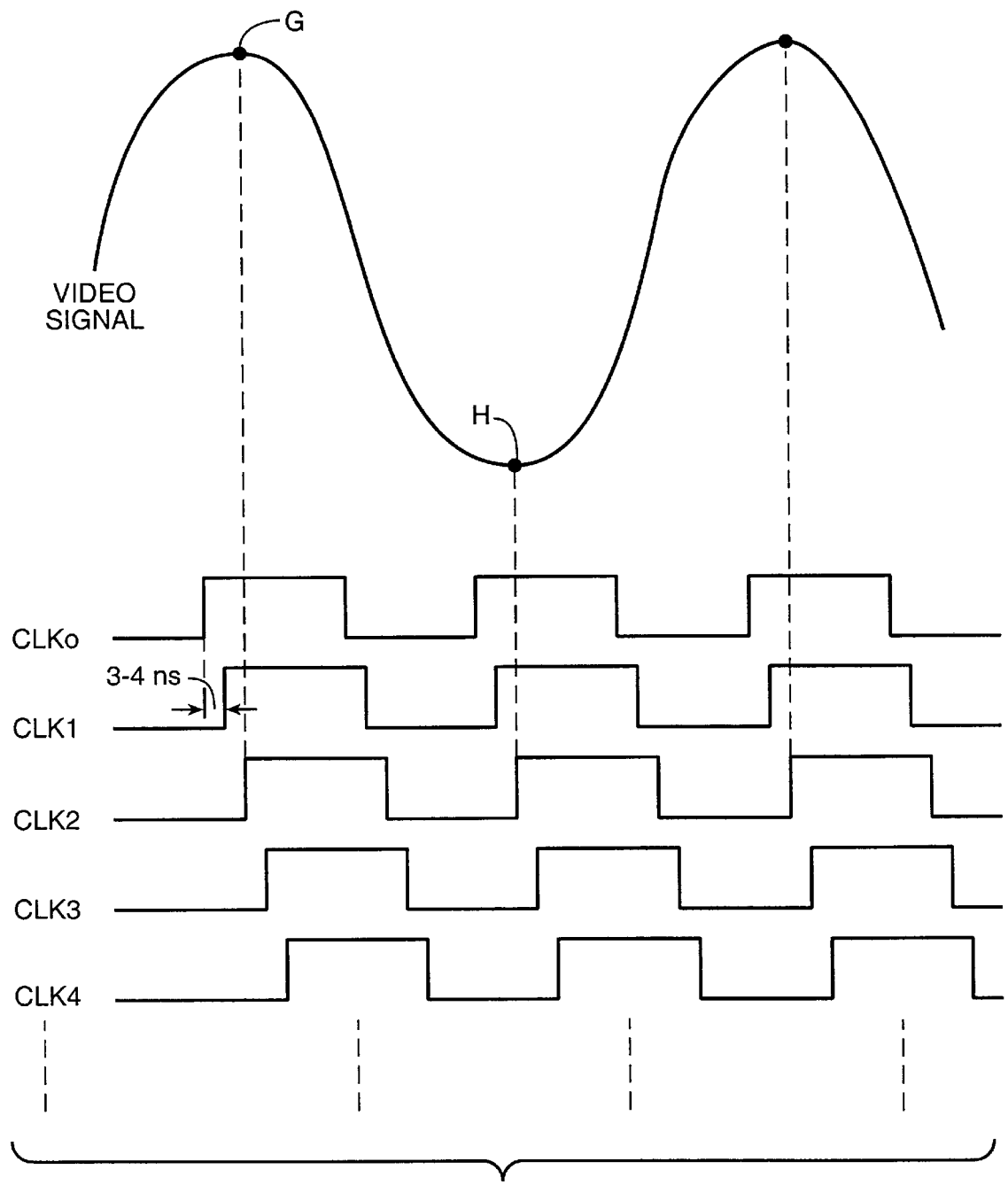
FIG. 5 illustrates the relationship between a video signal and a group of clock signals.
Figure 6:
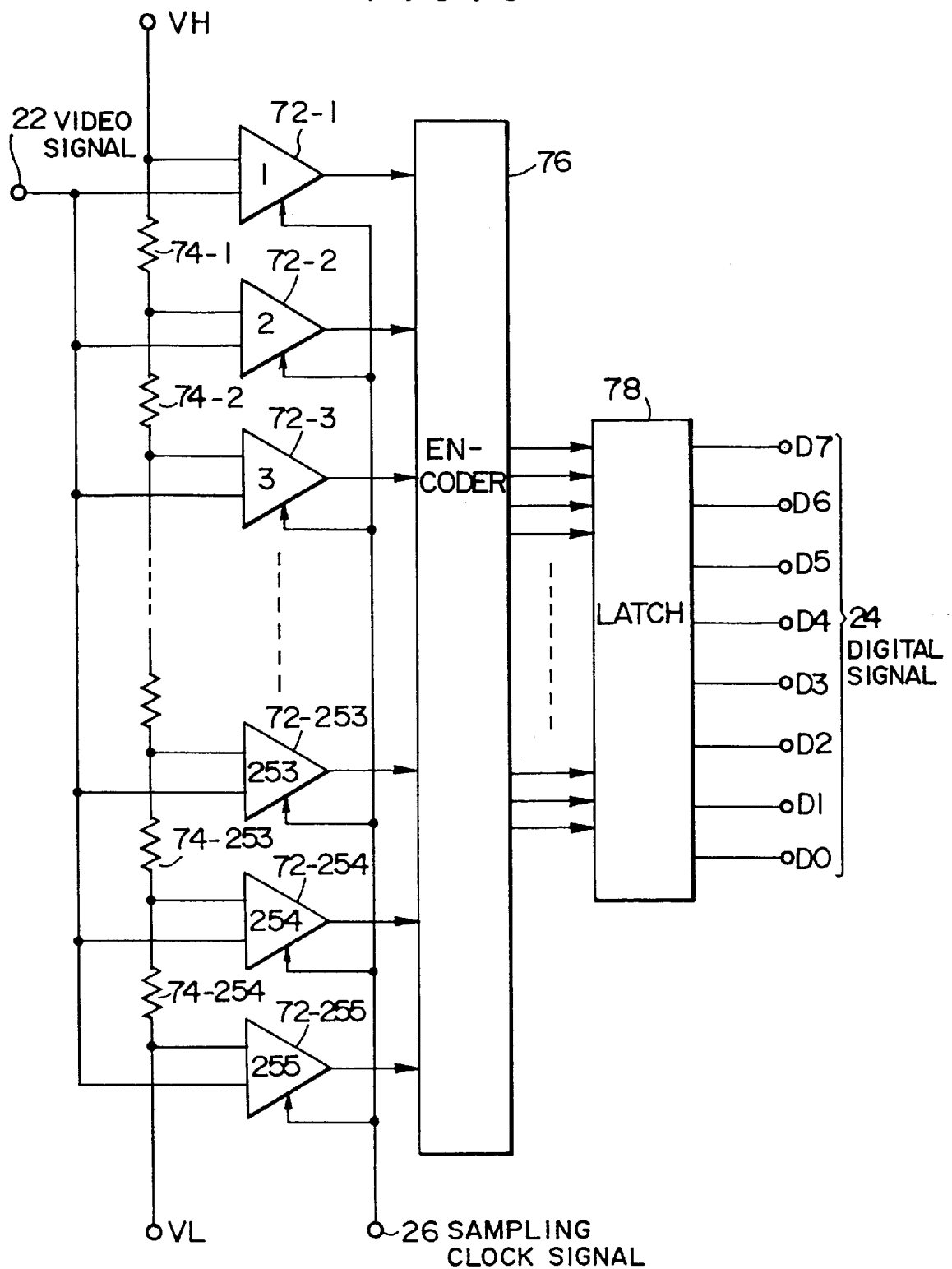
FIG. 6 shows an example of the configuration of an A/D converter.

The relationship between these outputs CLK1 to CLKn and the video signal 22 is shown in FIG. 5. As can be seen from this figure, the phase of CLK1 is shifted by 3 to 4 ns which is equivalent to the delay set by that buffer from that of CLK0. The relationship between CLK1 and CLK2, and between CLK3 and CLK4, etc, is the same. The selector 36 selects one clock signals from this group of clock signals CLK0 to CLKn having different phases, in accordance with an indication from the processor 20, and outputs that signal as the sampling clock signal 26 to the A/D converter 10. An edge of this sampling clock signal such as the rising edge should be matched with the maximum and minimum points of the brightness of the video signal 22. If the edge and these points are not matched, the picture quality will be greatly deteriorated in such a manner that the display device will shown grey, for example, even when the video signal specifies black. Therefore, the selector 36 selects a clock signal such as CLK2, and this CLK2 is used as the sampling clock signal 26 for output to the A/D converter 10. As shown in FIG. 5, the rising edges of CLK2 match a maximum point G and minimum point H of the brightness of the video signal 22. Therefore, a good-quality picture can be obtained by using this CLK2 to sample the video signal 22. An example of the configuration of the A/D converter 10 is shown in FIG. 6. The A/D converter 10 compares the input analog video signal 22 with various quantized levels, to convert the signal 22 into an 8-bit digital signal D0 to D7. A voltage range between an upper reference voltage VH and a lower reference voltage VL is divided by resistors 74-1 to 74-254, and the thus divided voltages are input to sampling comparators 72-1 to 72-255. These sampling comparators 72-1 to 72-255 sample the video signal 22 on the basis of the sampling clock signal 26 that is input thereto from the selector 36, and also compare the thus sampled video signal with the above described divided voltages. The results are output to an encoder 76 which determines a digital value corresponding to the level of the video signal 22, on the basis of these comparison results, and latches that value in a latch 78. The latched digital signal is output to the digital signal processor 12.

It should be noted that, although a parallel-comparator type of A/D converter is shown in FIG. 6, the configuration of the A/D converter is not limited thereto. This configuration may be of any form, such as a 2-step (N-step) parallel-comparator type of A/D converter, provided that an analog video signal is at least sampled with a sampling clock signal to implement an A/D conversion.

In this first embodiment, the processor 20 gives the selector an indication as to which sampling clock signal to select. In this case, this indication from the processor 20 is based on edge information that is input from the edge detection circuit 40, i.e., information indicating the position of the edge in the video signal.

Figure 7:
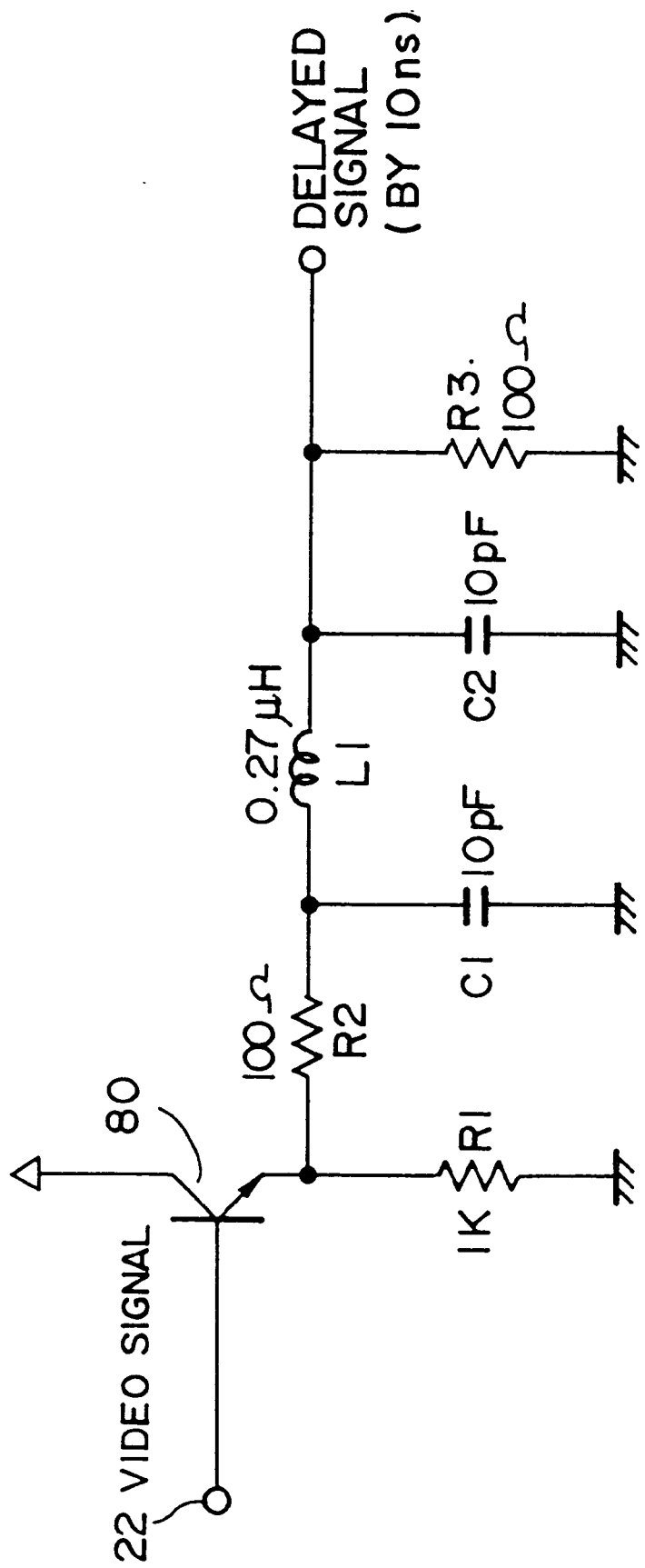
FIG. 7 shows an example of the configuration of a delay circuit.

The edge detection circuit 40 comprises a delay circuit 42, an inverting buffer 44, and a comparator 46, as shown in FIG. 1. An example of the configuration of the delay circuit 42 is shown in FIG. 7. The video signal 22 is buffered by a circuit consisting of a transistor 80 and a resistor R1, then is delayed by a circuit consisting of capacitors C1 and C2 and an inductance L1. In the example shown in FIG. 7, the video signal is delayed by approximately 10 ns. Note that R2 and R3 in this figure denote resistors for impedance matching.

Figure 8A:
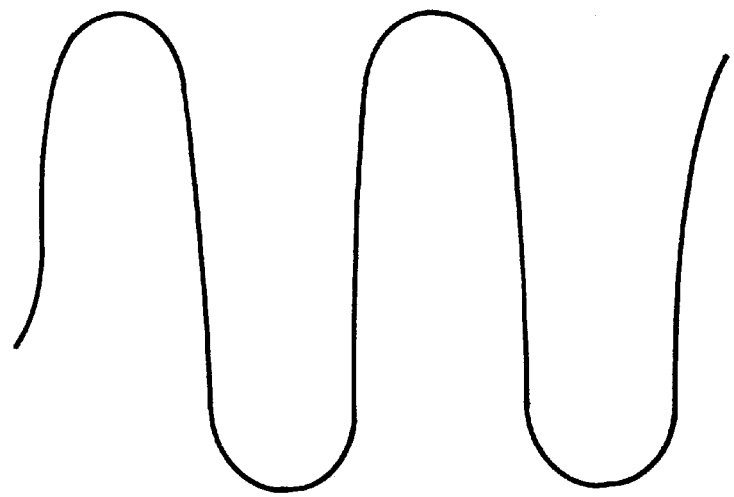
FIGS. 8A to 8C show examples of the waveforms of a video signal, edge pulses, and edge information.

The video signal 22 having a waveform such as that shown in FIG. 8A is input to the delay circuit 42 and the inverting buffer 44. The video signal that has been delayed by the delay circuit 42 is added to the video signal that has been inverted by the inverting buffer 44 to generate edge pulses such as those shown in FIG. 8B. The width of these edge pulses is set to be approximately 10 ns which is equivalent to the delay of the delay circuit 42. The edge pulses are input to one of the terminals of the comparator 46, such as the positive terminal, and is compared with a threshold voltage VT input to the other terminal such as the negative terminal. This causes a signal such as that shown in FIG. 8C to be output from the comparator 46, and the signal is input to the processor 20 as edge information.

Figure 8B:
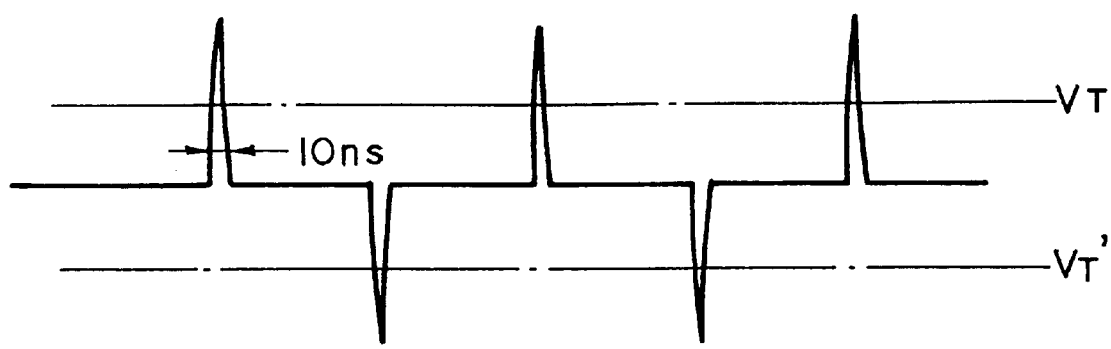
Figure 8C:
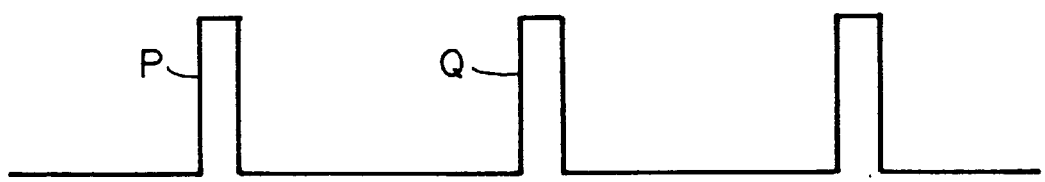

It should be noted that, although the rising edges of the video signal 22 are used as edge information in FIG. 8C, the falling edges are equally valid, as is a combination of both rising and falling edges. In such a case, a comparator is used that compares a threshold voltage VT' and edge pulses crossing the VT', as shown in FIG. 8B. The output of the comparator and that of the above described comparator which uses VT may be input to means such as an OR circuit.

The above described first embodiment is characterized in the generation of edge pulses by subtracting a delayed video signal from the video signal itself. This method of using a delay circuit has advantages, as described below.

Firstly, the width of the edge pulses shown in FIG. 8A is determined by the delay of the delay circuit 42, and thus the width can be set to be constant such as approximately 10 ns. Since this prevents problems such as variations in the width of the edge pulses according to the waveform of the video signal, this ensures stable operation of subsequent circuits such as the comparator 46.

Figure 9A:
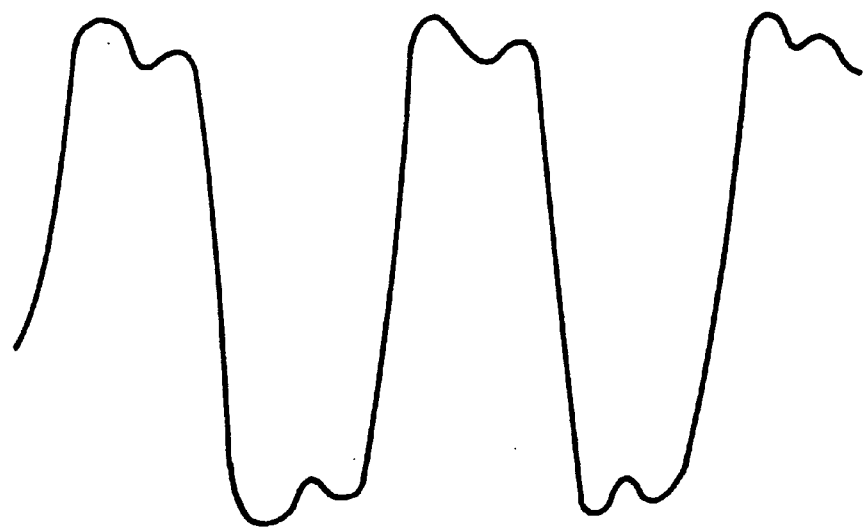
FIGS. 9A to 9C show further examples of the waveforms of a video signal, edge pulses, and edge information.
Figure 9B:
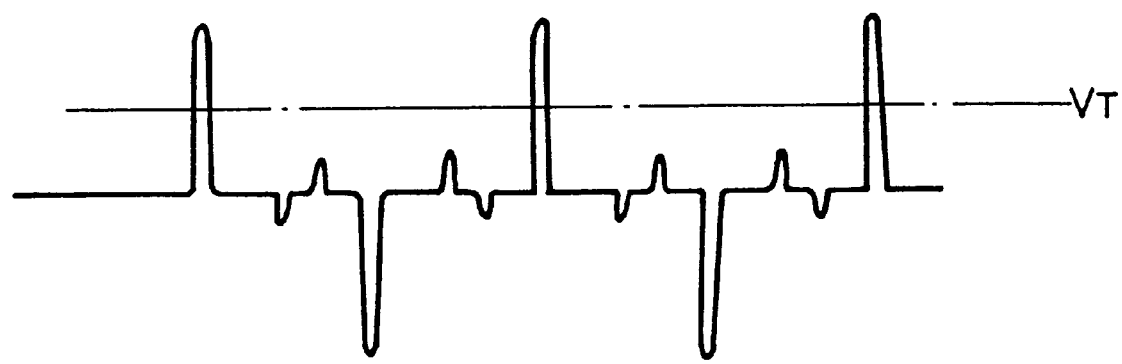
Figure 9C:
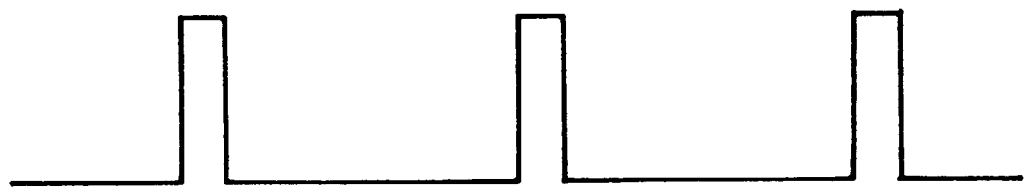

Secondly, if ringing should occur in the video signal, such as is shown for example in FIG. 9A, it is possible to rereduce the amplitude voltage of pulses generated at positions where ringing is generated, as shown in FIG. 9B. Therefore, appropriate edge information such as that shown in FIG. 9C can be output to the processor 20, even if problems such as ringing occur.

Thirdly, in conditions where the frequency characteristic of the video signal is poor or the signal is noisy, the present embodiment may generate edge pulses of a constant amplitude voltage and constant width, and thus obtain stable and appropriate edge information, regardless of the quality of the video signal.

Thus, the above described first embodiment enables the processor 20 to receive appropriate and stable edge information, regardless of the quality of the video signal, so that the processor 20 can select a sampling clock signal on the basis of this favorable edge information, in other words, adjust the phase of the sampling clock signal. The thus obtained appropriate and stable sampling clock signal 26 can be supplied to the A/D converter 10, enabling a huge improvement in display quality.

It should be noted that, although the phase adjustment of the sampling clock signal in accordance with the first embodiment uses components such as the reference clock signal extraction circuit 32, the multi-stage clock signal delay circuit 34, and the selector 36, the present invention is not limited thereto and various other equivalent circuit configurations can be used instead. For example, the reference clock signal CLK0 may be supplied from external equipment, not extracted from the video signal 22. Note also that the circuit for obtaining edge pulses from the video signal 22 and a delayed video signal is not limited to the configuration shown in FIG. 1. Similarly, the configuration may be one in which components such as the comparator 46 are omitted and edge pulses are used as the edge information without modification.

Second Embodiment

A second embodiment of the present invention is provided with a circuit that adjusts the threshold voltage VT used for comparing edge pulses. An example of the configuration of the present embodiment is shown in FIG. 10.

An adjustment circuit 82 comprises an integrating circuit 84, an LPF 86, and a reference threshold voltage generation circuit 88. The threshold voltage VT, which is an output from the circuit 82, is input to the negative terminal of the comparator 46. The comparator 46 compares the threshold voltage VT and the edge pulses as shown in FIG. 8B, and outputs the edge information shown in FIG. 8C. It is clear from FIG. 8B that, if VT is too small, the comparator 46 will react to pulses caused by factors such as low-level noise in the amplitude voltage. On the other hand, if VT is too large, the problem will occur that the comparator 46 will not react to the edge pulses. These problems can be solved by the provision of the adjustment circuit 82 for adjusting the threshold voltage VT.

Figure 10:
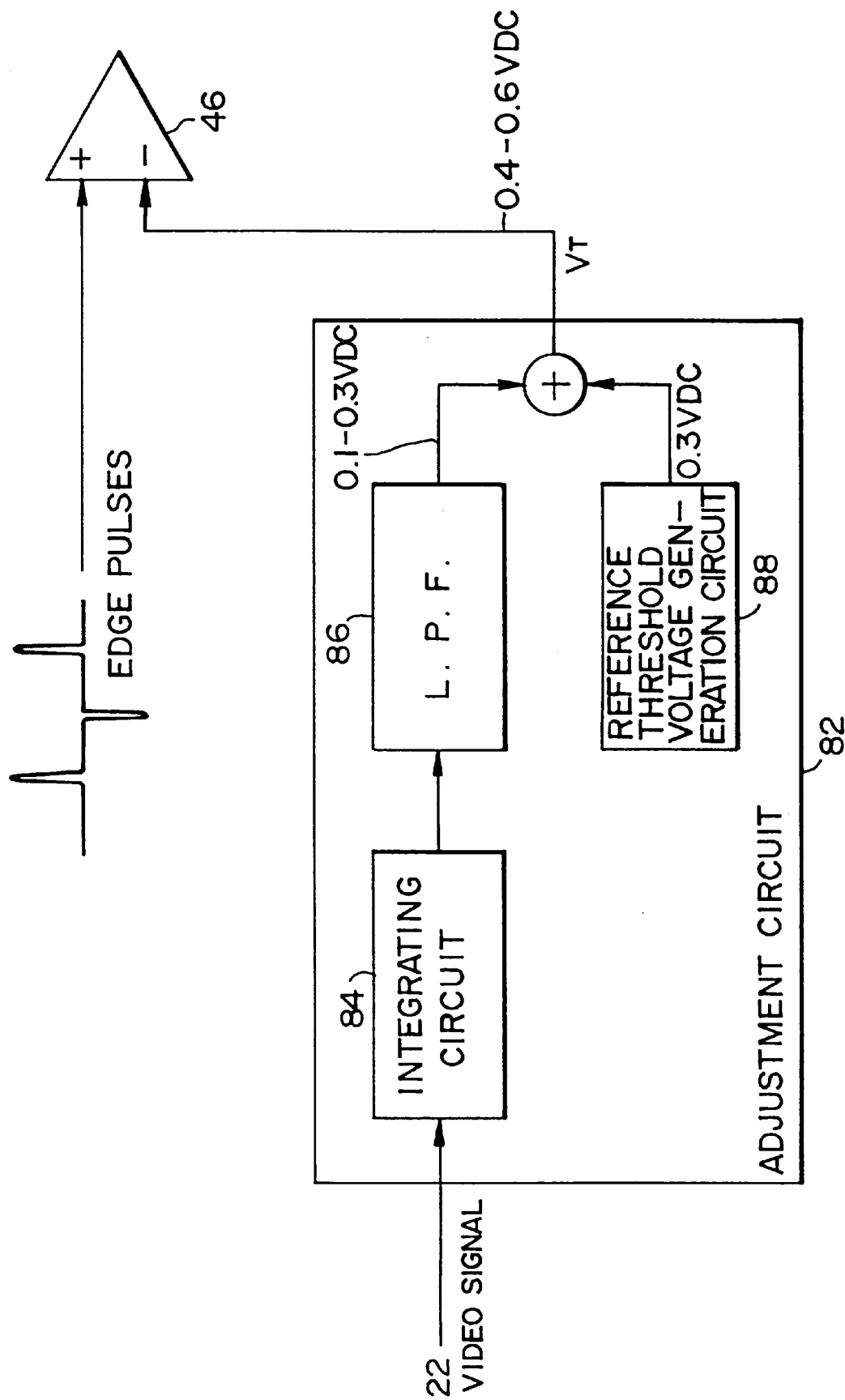
FIG. 10 shows an example of the configuration of a second embodiment.

With the circuitry shown in FIG. 10, the value of the threshold voltage VT is adjusted according to the amplitude voltage of the video signal 22. Assume for example that a waveform signal shown in FIG. 11A is input as the video signal 22 This video signal 22 is integrated by the integrating circuit 84, so that a waveform signal similar to that shown in FIG. 11B is output from the integrating circuit 84. When this signal is input to the LPF 86, a DC voltage of, for example, 0.3 V is output from the LPF 86, as shown in FIG. 11C. This 0.3-V DC voltage is added to a 0.3-V DC voltage that is output from the reference threshold voltage generation circuit 88, so that, as a result, a threshold voltage VT of 0.6 V is output from the adjustment circuit 82. If, however, a waveform video signal such as that shown in FIG. 11D whose overall amplitude voltage is lower than the waveform video signal of FIG. 11A is input, a waveform signal such as that shown in FIG. 11E is output from the integrating circuit 84, and a DC voltage of 0.1 V is output from the LPF, as shown in FIG. 11F. Thus a threshold voltage VT of 0.4 V is output.

As described above, the present embodiment ensures that the threshold voltage VT increases if the amplitude voltage of the video signal 22 is large overall. The threshold voltage VT decreases if the amplitude voltage is small. In general, the amplitude voltage of edge pulses is often dependent on the magnitude of the amplitude voltage of the video signal. Thus it is possible to implement an edge detection circuit which is not susceptible to noise and which can accurately detect edges in the video signal, by adjusting the threshold voltage VT in accordance with the magnitude of the amplitude voltage of the video signal.

It should be noted that the method of adjusting the threshold voltage VT in accordance with the present invention is not limited to the second embodiment as described above. Any method can be used therefor, provided that it at least allows for the mutual relationship between the magnitude of the amplitude voltage of the edge pulses and the magnitude of the threshold voltage VT. The configuration of the edge detection circuit and other circuitry can also be implemented in many different ways.

Third Embodiment

Figure 12:
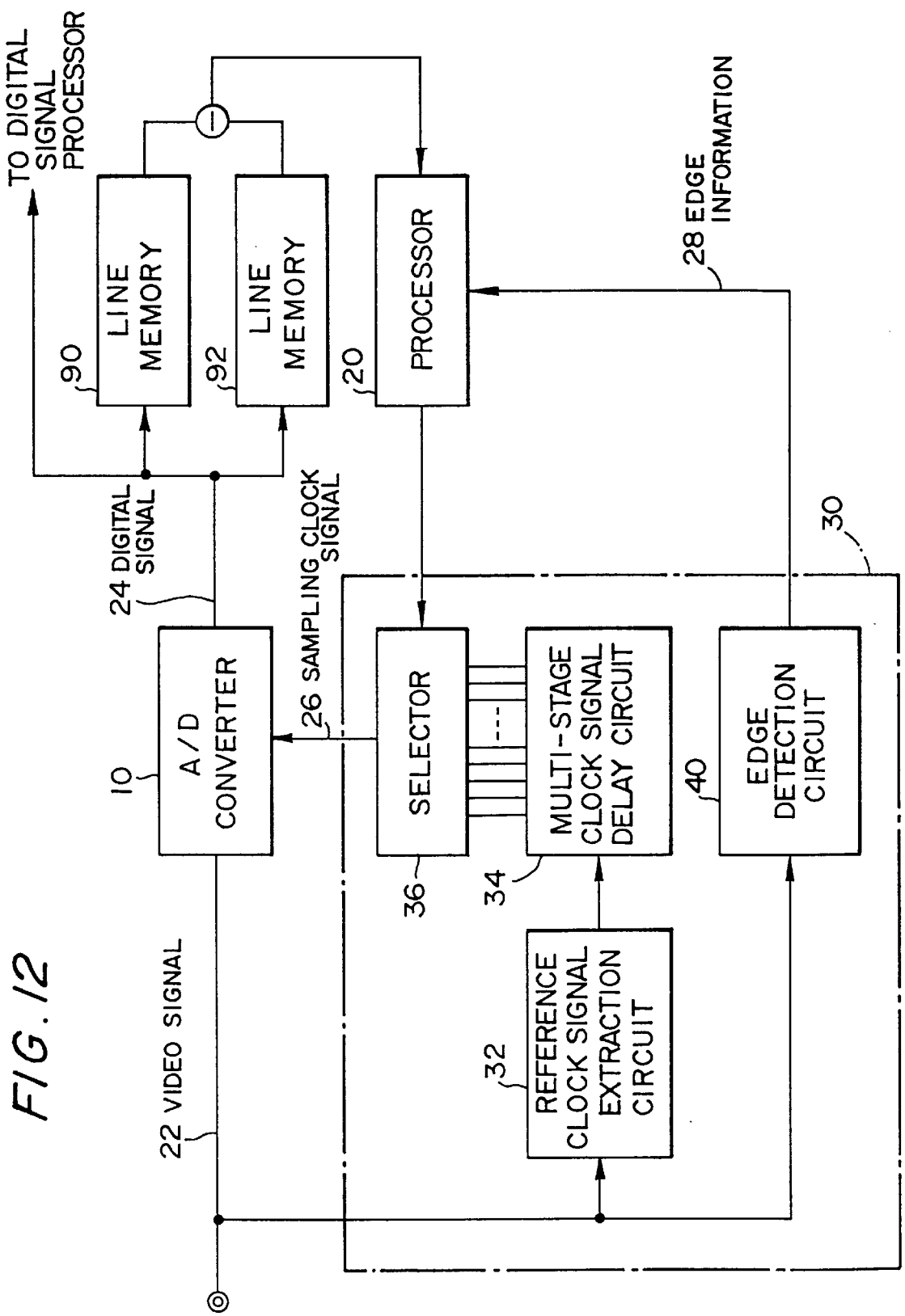
FIG. 12 shows an example of the configuration of a third embodiment an example of the configuration.

A third embodiment of the present invention adjusts the phase of the sampling clock signal on the basis of a digital signal that is output from the A/D converter. An example of the configuration of this embodiment is shown in FIG. 12.

In this figure, components such as line memories 90 and 92 and the processor 20 act as phase adjustment means. Each of these line memories 90 and 92 holds a given amount of data, such as data for one scan line, that is output from the A/D converter 10. The configuration may, of course, be such that data for a plurality of scan lines is held therein. In the same manner as in the first embodiment, the sampling clock signal supply circuit 30 may comprise a reference clock signal extraction circuit 32, a multi-stage clock signal delay circuit 34, a selector 36, and an edge detection circuit 40.

An example of the operation of this third embodiment will now be described. At initialization, the processor 20 indicates to the selector 36 which of a group of clock signals CLK0 to CLKn is to be selected, on the basis of the edge information 28 from the edge detection circuit 40. If the edge information is as shown in FIG. 8C, for example, a clock signal with a rising edge that occurs at a position that is one-quarter of the distance between an edge P and an edge Q is selected as the initial sampling clock signal.

The video signal 22 is then sampled and converted into a digital signal by the A/D converter 10, on the basis of the initial sampling clock signal. The result of this A/D conversion is stored in the line memory 90. The selector 36 then modifies the group of clock signals to be selected. If the initial sampling clock signal is CLKm, for example, either CLKm−1 or CLKm+1 is selected. The phase of each of these signals CLKm−1 and CLKm+1 differs from that of CLKm by about 3 to 4 ns. This CLKm−1 or CLKm+1 is then used as the sampling clock signal by the A/D converter 10 for sampling and converting the video signal 22. The result of this A/D conversion is stored in the line memory 92.

The difference between the two sets of data stored in the line memories 90 and 92 is calculated. The processor 20 determines the point at which this difference is at a minimum, and that the clock signal selected at that point has the optimal phase. The processor 20 indicates to the selector 36 that this clock signal is to be selected as the sampling clock signal, and subsequent sampling of the video signal 22 is based on that sampling clock signal.

It should be noted that the method of adjusting the phase of the sampling clock signal in accordance with the present invention is not limited to this third embodiment as described above, provided that it is based on at least a digital signal output from the A/D converter. For example, three line memories may be provided, or a field memory for storing enough data for one full screen may by provided instead. Since the method of using edge information makes it possible to provide an initial setting for phase adjustment, the method is advantageous in that it enables simple and rapid implementation of the phase adjustment. However, the phase can also be adjusted without using edge information. In such a case, allot the differences including the difference in digital signal when the sampling clock signal is CLK0 and then CLK1, and the difference when the sampling clock signal is CLK1 and then CLK2 are obtained. The minimum of all of these differences can then de determined.

The configuration of the sampling clock signal supply circuit 30 is not limited to that shown in FIG. 12.

Fourth Embodiment

Figure 13:
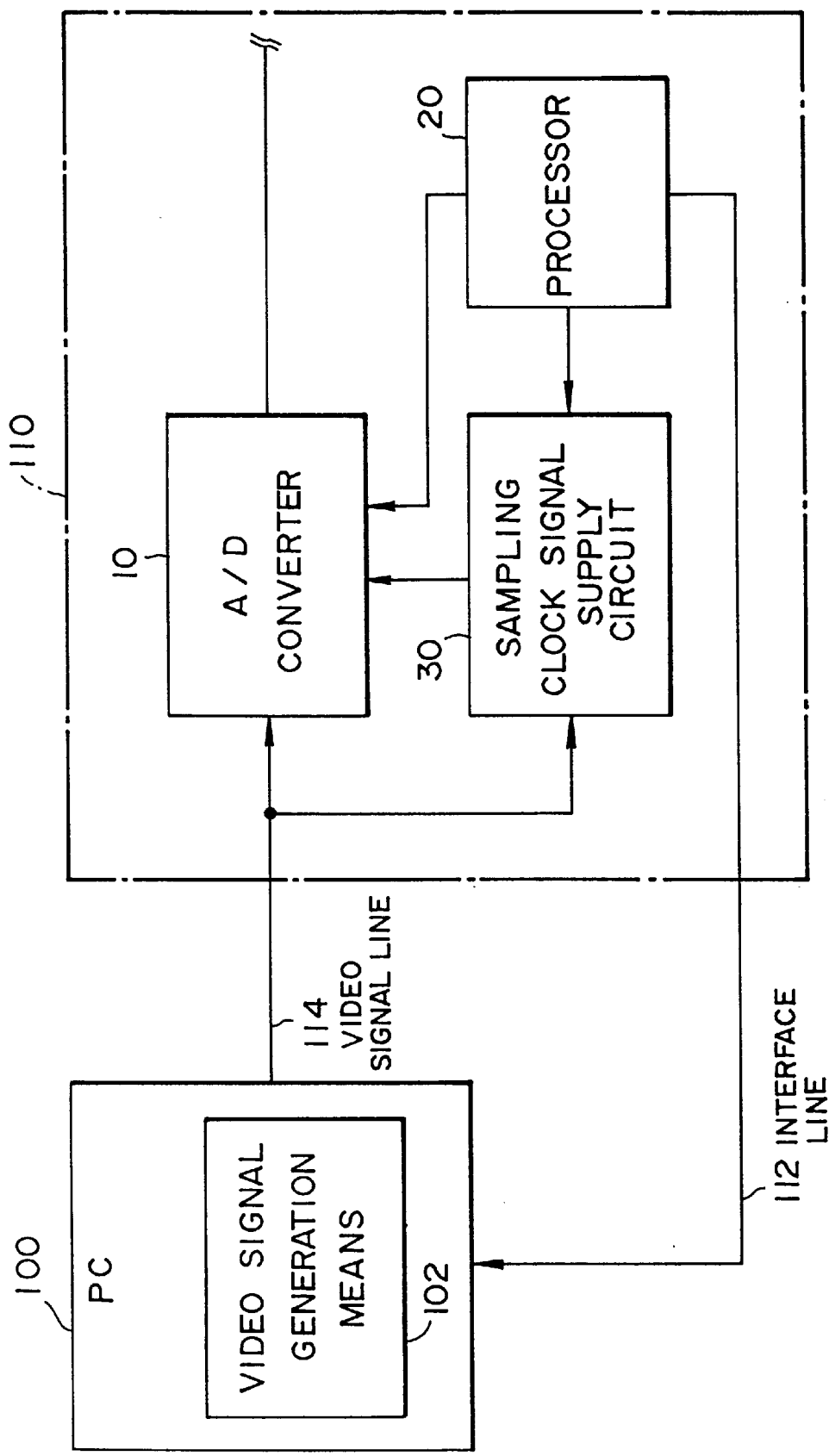
FIG. 13 shows an example of the configuration of a fourth embodiment.

A fourth embodiment of the present invention facilitates the phase adjustment by supplying a phase-adjustment video signal to the video signal processing device. An example of the configuration of the present embodiment is shown in FIG. 13.

As shown in this figure, a video signal is supplied to a video signal processing device 110 from a personal computer 100 via a video signal line 114. At this point, a video signal generation means 102 within the personal computer 100 generates a video signal for phase adjustment. The sampling clock signal supply circuit 30 adjusts the phase of the sampling clock signal on the basis of this phase-adjustment video signal, then supplies the sampling clock signal that has been subjected to the phase adjustment to the A/D converter 10. Various software is installed in this personal computer 100, such as its own operating system, driver software (device driver) for appropriately operating the video signal processing device 110, and application software for image display. This driver and application software acts as the video signal generation means 102 and the phase-adjustment video signal is generated thereby.

In this embodiment, the phase-adjustment video signal may equally well be supplied through an RS-232C or similar interface line 112, whereby the processor 20 can instruct the personal computer 100. It may be that the video signal processing device 110 requires a given period of time before it is capable of displaying images. It may be a projection type of display system that requires a given period of time before the lamp and other components go on standby. Since image display is impossible during this period of time, it is preferable that the blank time is used for adjusting the phase of the sampling clock signal. In this embodiment, this blank time is used by the processor 20 to indicate to the personal computer 100 that the phase-adjustment video signal is supplied. This makes it possible to use the blank time for phase adjustment, so that the video signal processing device 110 can display images immediately if it is on standby.

It should be noted that the indication that the phase-adjustment video signal is supplied can be made through various types of interface; not just an RS-232C interface. For example, an unused line i.e., unused pin within the cable supplying the video signal may be used to send this indication. If, for example, the video signal line 114 has two unused lines, these lines may be allocated to a digital data control (DDC) clock signal and DDC data. The processor 20 would use this DDC clock signal and DDC data to indicate to the personal computer 100 that the phase-adjustment video signal is supplied.

Figure 14A:
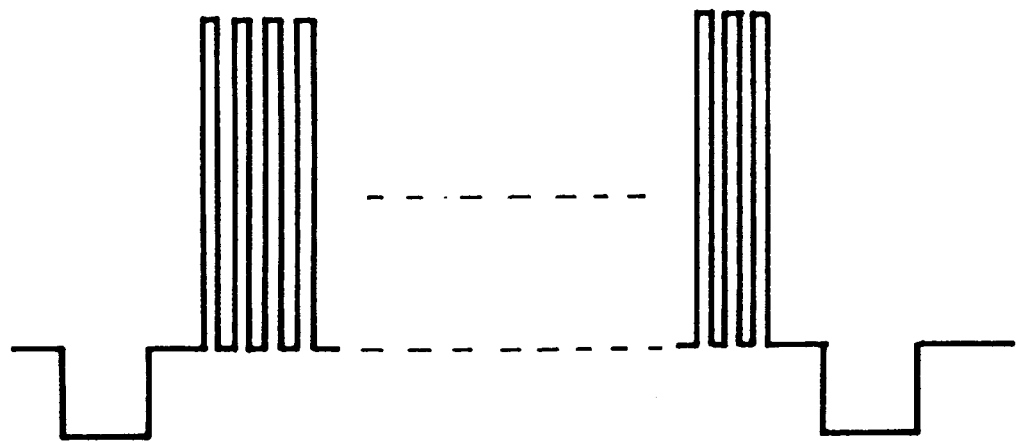
FIGS. 14A and 14B illustrate a phase-adjustment video signal.
Figure 14B:
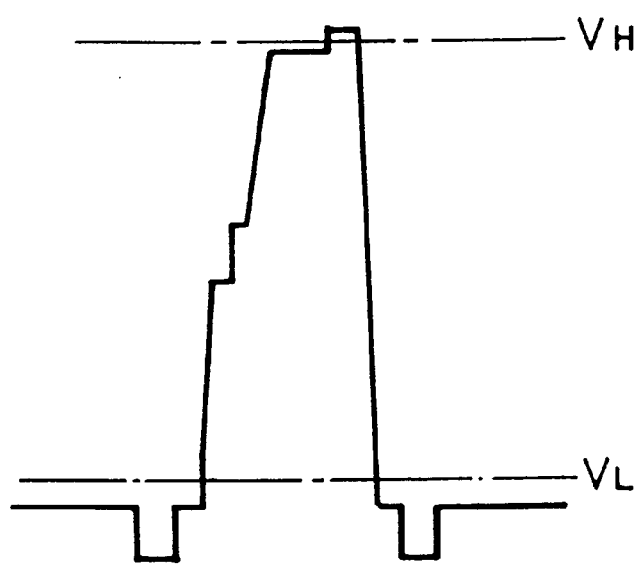

The phase-adjustment video signal will now be described in detail. First of all, the phase-adjustment video signal preferably is one having a repeating pattern of maximum and minimum brightness values for each one-dot clock signal, such as a repeating black/white pattern, as shown in FIG. 14A. This is because if a pattern in which all of the dots are black or white is input as the video signal, edge pulses are not generated and it is difficult for the sampling clock signal supply circuit 30 to detect edge information. Secondly, the amplitude width of the phase-adjustment video signal is preferably slightly wider than a window defined by voltage levels VH and VL, as shown in FIG. 14B.. In other words, the maximum brightness of the phase-adjustment video signal, for example, the white level, is preferably slightly greater by, for example, one quantized level than VH whereas the minimum brightness thereof is slightly smaller by, for example, one quantized level than VL. These levels VH and VL act as upper and lower reference voltages for the A/D converter 10, as shown in FIG. 6, and define an A/D conversion window for the A/D converter 10. The A/D converter 10 divides the voltage difference defined by this window into a number of levels, such as 256 levels (for 8-bit display).

The voltage difference between the black and white levels is regulated by the analog video signal interface to be 0.714 V, for example. Therefore it is common to fix the width of this window to 0.71 V. However, personal computers that can supply video signal are made by different manufacturers and name different capabilities, causing various problems such as a voltage difference between the black and white levels being greater than 0.714 V, or less than 0.714 V, which adversely affects the resolution of the A/D conversion. In order to prevent such problems, the video signal generation means 102 in the personal computer 100 outputs a video signal with an amplitude voltage that is slightly wider than the window width, as a phase-adjustment video signal. The processor 20 may also indicate to the personal computer 100 that a video signal with this larger amplitude voltage is to be output.

The configuration may also be such that the values of VH and VL set by the A/D converter 10 can be changed by the use of components such as resistors, to match the type of personal computer being used.

Since this fourth embodiment makes it possible to adjust the phase of the sampling clock signal without wasting any time using a phase-adjustment video signal that has been optimized for phase adjustment, it enables huge improvements in display quality and ease of use.

It should be noted that the present invention is not to be taken as being limited to the above described first to fourth embodiments; the present invention can be modified in various ways within the scope of the claims stated herein.

For example, although the present invention is particularly suitable for a projection type of display system, it can also be applied to other types of information processing system such as a multimedia system.

The configurations of circuits such as the sampling clock signal supply circuit and edge detection circuit should also not be taken as limited to those described in the above described first to fourth embodiment; other equivalent circuits can be used instead.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A video signal processing device, comprising:

an A/D converter which samples an analog video signal having a frequency corresponding to various types of image supply apparatus by a given sampling clock signal, and converts said sampled signal into a digital signal;

a sampling clock signal supply circuit for supplying said sampling clock signal to said A/D converter;

wherein said sampling clock signal supply circuit comprises an edge detection circuit for obtaining edge information to adjust the phase of said sampling clock signal; and said edge detection circuit comprises a circuit for generating an edge pulse by subtraction processing based on said video signal and a delayed video signal.

2. The video signal processing device as defined in claim 1, wherein said edge detection circuit comprises a circuit for comparing the amplitude voltage of said edge pulse with a given threshold voltage and an adjustment circuit for adjusting the value of said threshold voltage.

3. The video signal processing device as defined in claim 1, further comprising a phase adjustment means for adjusting the phase of said sampling clock signal based on said digital signal that is output from said A/D converter.

4. A video signal processing device, comprising:

an A/D converter which samples an analog video signal having a frequency corresponding to various types of image supply apparatus by a given sampling clock signal, and converts said sampled signal into a digital signal;

a sampling clock signal supply circuit for supplying said sampling clock signal to said A/D converter;

wherein said sampling clock signal supply circuit comprises an edge detection circuit for obtaining edge information to adjust the phase of said sampling clock signal; and said edge detection circuit comprises a circuit for generating an edge pulse based on said video signal, a circuit for comparing the amplitude voltage of said edge pulse with a given threshold voltage, and an adjustment circuit for adjusting the value of said threshold voltage.

5. The video signal processing device as defined in claim 4, wherein said adjustment circuit adjusts said threshold voltage according to the magnitude of an amplitude voltage of said video signal.

6. A video signal processing device, comprising:
an A/D converter which samples an analog video signal having a frequency corresponding to various types of image supply apparatus by a given sampling clock signal, and converts said sampled signal into a digital signal;
a sampling clock signal supply circuit for supplying said sampling clock signal to said A/D converter;
a phase adjustment means for adjusting the phase of said sampling clock signal based on said digital signal that is output from said A/D converter;
an extraction circuit to extract a reference clock signal from said video signal;
a clock generator to generate clock signals with different phases based on said reference clock signal extracted by said extraction circuit;
a selector to select one of said clock signals and to supply said selected clock signal as said sampling signal to said A/D converter; and
an indicating circuit to indicate which of said clock signals is to be selected by said selector.

7. The video signal processing device as defined in claim 6, wherein said phase adjustment means adjusts the phase of said sampling clock signal by comparing a first digital signal that is output from said A/D converter when said sampling clock signal has a first phase and a second digital signal that is output from said A/D converter when said sampling clock signal has a second phase.

8. The video signal processing device as defined in claim 1, further comprising:
a circuit for extracting a reference clock signal from said video signal;
a circuit for generating clock signals with different phases based on said extracted reference clock signal;
a selector for selecting one of said clock signals and supplying said selected clock signal as said sampling clock signal to said A/D converter; and
means for indicating to said selector which of said clock signals is to be selected.

9. The video signal processing device as defined in claim 4, further comprising:
a circuit for extracting a reference clock signal from said video signal;
a circuit for generating clock signals with different phases based on said extracted reference clock signal;
a selector for selecting one of said clock signals and supplying said selected clock signal as said sampling clock signal to said A/D converter; and
means for indicating to said selector which of said clock signals is to be selected.

10. An information processing system comprising:
an image supply apparatus for supplying a video signal; and
a video signal processing device, comprising:
an A/D converter which samples said video signal having a frequency corresponding to various types of image supply apparatus by a given sampling clock signal, and converts said sampled signal into a digital signal,
a sampling clock signal supply circuit for supplying said sampling clock signal to said A/D converter,
wherein said sampling clock signal supply circuit comprises an edge detection circuit for obtaining edge information to adjust the phase of said sampling clock signal, and
said edge detection circuit comprises a circuit for generating an edge pulse by subtraction processing based on said video signal and a delayed video signal,
wherein said video signal processing device comprises means for subjecting said digital signal that is output from said A/D converter to given digital signal processing.

11. An information processing system comprising:
an image supply apparatus for supplying a video signal; and
a video signal processing device, comprising:
an A/D converter which samples said video signal having a frequency corresponding to various types of image supply apparatus by a given sampling clock signal, and converts said sampled signal into a digital signal,
a sampling clock signal supply circuit for supplying said sampling clock signal to said A/D converter,
wherein said sampling clock signal supply circuit comprises an edge detection circuit for obtaining edge information to adjust the phase of said sampling clock signal, and
said edge detection circuit comprises a circuit comprises for generating an edge pulse based on said video signal, a circuit for comparing the amplitude voltage of said edge pulse with a given threshold voltage, and an adjustment circuit for adjusting the value of said threshold voltage, and
wherein said video signal processing device comprises means for subjecting said digital signal that is output from said A/D converter to given digital signal processing.

12. An information processing system comprising:
an image supply apparatus for supplying a video signal; and
a video signal processing device, comprising:
an A/D converter which samples said video signal having a frequency corresponding to various types of image supply apparatus by a given sampling clock signal, and converts said sampled signal into a digital signal,
a sampling clock signal supply circuit for supplying said sampling clock signal to said A/D converter,
a phase adjustment means for adjusting the phase of said sampling clock signal based on the digital signal that is output from said A/D converter;
an extraction circuit to extract a reference clock signal from said video signal;
a clock generator to generate clock signals with different phases based on said reference clock signal extracted by said extraction circuit;
a selector to select one of said clock signals and to supply said selected clock signal as said sampling signal to said A/D converter; and
an indicating circuit to indicate which of said clock signals is to be selected by said selector,
wherein said video signal processing device comprises means for subjecting said digital signal that is output from said A/D converter to given digital signal processing.

13. An information processing system comprising:

an image supply apparatus for supplying a video signal; and a video signal processing device, comprising:
- an A/D converter which samples said video signal having a frequency corresponding to various types of image supply apparatus by a given sampling clock signal, and converts said sampled signal into a digital signal,
- a sampling clock signal supply circuit for supplying said sampling clock signal to said A/D converter,
- wherein said sampling clock signal supply circuit comprises an edge detection circuit for obtaining edge information to adjust the phase of said sampling clock signal, and
- said edge detection circuit comprises a circuit for generating an edge pulse by subtraction processing based on said video signal and a delayed video signal, wherein said video signal processing device comprises means for converting a given television video signal into a television video digital signal and means for selecting one of said television video digital signal and said digital signal that is output from said A/D converter as an image signal.

14. An information processing system comprising:

an image supply apparatus for supplying a video signal; and a video signal processing device, comprising:
- an A/D converter which samples said video signal having a frequency corresponding to various types of image supply apparatus by a given sampling clock signal, and converts said sampled signal into a digital signal,
- a sampling clock signal supply circuit for supplying said sampling clock signal to said A/D converter,
- wherein said sampling clock signal supply circuit comprises an edge detection circuit for obtaining edge information to adjust the phase of said sampling clock signal, and
- said edge detection circuit comprises a circuit for generating an edge pulse based on said video signal, a circuit for comparing the amplitude voltage of said edge pulse with a given threshold voltage, and an adjustment circuit for adjusting the value of said threshold voltage, and wherein said video signal processing device comprises means for converting a given television video signal into a television video digital signal and means for selecting one of said television video digital signal and said digital signal that is output from said A/D converter as an image signal.

15. An information processing system comprising:

an image supply apparatus for supplying a video signal; and a video signal processing device, comprising:
- an A/D converter which samples said video signal having a frequency corresponding to various types of image supply apparatus by a given sampling clock signal, and converts said sampled signal into a digital signal,
- a sampling clock signal supply circuit for supplying said sampling clock signal to said A/D converter,
- a phase adjustment means for adjusting the phase of said sampling clock signal based on a digital signal that is output from said A/D converter;
- an extraction circuit to extract a reference clock signal from said video signal;
- a clock generator to generate clock signals with different phases based on said reference clock signal extracted by said extraction circuit;
- a selector to select one of said clock signals and to supply said selected clock signal as said sampling signal to said A/D converter; and
- an indicating circuit to indicate which of said clock signals is to be selected by said selector, wherein said video signal processing device comprises means for converting a given television video signal into a television video digital signal and means for selecting one of said television video digital signal and said digital signal that is output from said A/D converter as an image signal.

16. An information processing system comprising:

an image supply apparatus for supplying a video signal as a first output, comprising:
- means for generating a phase-adjustment video signal as a second output; and
- a video signal processing device for performing a given type of signal processing on said video signal output from said image supply apparatus, comprising:
  - an A/D converter which samples said video signal supplied from said image supply apparatus by a given sampling clock signal, and converts said sampled signal into a digital signal; and
  - a sampling clock signal supply circuit for supplying said A/D converter with a sampling clock signal whose phase is adjusted based on said phase-adjustment video signal.

17. The information processing system as defined in claim 16, wherein said video signal processing device comprises means for indicating to said image supply apparatus to supply said phase-adjustment video signal.

18. A method of processing a video signal, comprising:

a subsampling step for subsampling an analog video signal having a frequency corresponding to various types of image supply apparatus by a sampling clock signal wherein the phase thereof is adjusted; a conversion step for converting said subsampled signal into a digital signal;

an edge detection step for obtaining edge information to adjust the phase of said sampling clock signal; and wherein said edge detection step further comprises a generation step for generating an edge pulse by subtraction processing based on said video signal and a delayed video signal.

19. A method of processing a video signal, comprising:

a subsampling step for subsampling an analog video signal having a frequency corresponding to various types of image supply apparatus by a sampling clock signal wherein the phase thereof is adjusted; a conversion step for converting said subsampled signal into a digital signal;

an edge detection step for obtaining edge information to adjust the phase of said sampling clock signal; and wherein said edge detection step further comprises a generation step for generating an edge pulse based on said video signal, a comparison step for comparing the amplitude voltage of said edge pulse and a given threshold voltage, and a adjustment step for adjusting the value of said threshold voltage.

20. A method of processing a video signal, comprising:

a subsampling step for subsampling an analog video signal having a frequency corresponding to various types of image supply apparatus by a sampling clock signal wherein the phase thereof is adjusted; a conversion step for converting said subsampled signal into a digital signal; and an adjustment step for adjusting the phase of said sampling clock signal based on said digital signal obtained by said conversion step, extracting a reference clock signal from said video signal;

generating clock signals with different phases based on said extracted reference clock signal;

selecting one of said clock signals and supplying said selected clock signal as said sampling clock signal to said A/D converter; and indicating which of said clock signals is to be selected in said selecting step.

* * * * *

UNITED STATES PATENT AND TRADEMARK OFFICE
CERTIFICATE OF CORRECTION

PATENT NO. : 5,936,678
DATED : August 10, 1999
INVENTOR(S) : Satoshi Hirashima

It is certified that an error appears in the above identified patent and that said Letters Patent is hereby corrected as shown below:

Column 14, line 28, delete the second occurrence of "comprises".

Signed and Sealed this

Eighth Day of February, 2000

*Attest:*

Q. TODD DICKINSON

*Attesting Officer*  *Commissioner of Patents and Trademarks*